(12) United States Patent
Audeon et al.

(10) Patent No.: US 7,594,792 B2
(45) Date of Patent: Sep. 29, 2009

(54) SEALING DEVICE FOR A CHAMBER OF A TURBOMACHINE, AND AIRCRAFT ENGINE EQUIPPED WITH SAID SEALING DEVICE

(75) Inventors: David Audeon, Massy (FR); Kamel Benderradji, Livry sur Seine (FR); Marc Roger Marchi, Le Mee S/Seine (FR)

(73) Assignee: SNECMA, Paris (FR)

(*) Notice: Subject to any disclaimer, the term of this patent is extended or adjusted under 35 U.S.C. 154(b) by 331 days.

(21) Appl. No.: 11/410,036

(22) Filed: Apr. 25, 2006

(65) Prior Publication Data
US 2006/0245924 A1 Nov. 2, 2006

(30) Foreign Application Priority Data
Apr. 27, 2005 (FR) .................................. 05 51090

(51) Int. Cl.
*F01D 11/00* (2006.01)
(52) U.S. Cl. .................. 415/135; 415/136; 415/138; 415/214.1; 277/630; 277/633; 277/637; 277/641; 277/644

(58) Field of Classification Search ......... 415/134–136, 415/138–139, 170.1, 173.1, 173.3, 174.2, 415/214.1; 60/796–800; 277/610, 630, 633, 277/637, 641, 644
See application file for complete search history.

(56) References Cited

U.S. PATENT DOCUMENTS

| 4,063,845 | A | | 12/1977 | Allen | |
|---|---|---|---|---|---|
| 4,189,819 | A | * | 2/1980 | Nicholson | 277/610 |
| 4,314,792 | A | * | 2/1982 | Chaplin | 415/135 |
| 6,076,835 | A | | 6/2000 | Ress et al. | |
| 6,575,697 | B1 | | 6/2003 | Arilla et al. | |
| 2004/0021274 | A1 | * | 2/2004 | Ueda | 277/633 |
| 2007/0025841 | A1 | * | 2/2007 | Milazar | 415/134 |

FOREIGN PATENT DOCUMENTS

| GB | 2129880 A | * | 5/1984 | 415/173.3 |
|---|---|---|---|---|
| WO | WO-2005/026502 A1 | * | 3/2005 | |

* cited by examiner

*Primary Examiner*—Christopher Verdier
(74) *Attorney, Agent, or Firm*—Oblon, Spivak, McClelland, Maier & Neustadt, L.L.P.

(57) ABSTRACT

The gastight sealing device associated with a functional clearance existing between two sectors of a turbomachine includes an annular plate wound up on itself over at least one turn, covering functional clearance.

10 Claims, 3 Drawing Sheets

SEALING DEVICE FOR A CHAMBER OF A TURBOMACHINE, AND AIRCRAFT ENGINE EQUIPPED WITH SAID SEALING DEVICE

BACKGROUND OF THE INVENTION

1. Technical Field

The present invention relates to the field of gastight sealing between a gas stream in a turbomachine and an enclosure separated from the stream by a ring. It aims to provide a solution to the problem of the reintroduction of very hot air into an enclosure, the very hot air coming from the very high-temperature gas stream.

In particular, the subject of the invention is a sealing device intended to provide such gastight sealing, and also a turbomachine equipped with such a sealing device.

The turbomachine is for example an aircraft engine.

2. Prior Art

In a turbomachine, such as an aircraft engine, the very hot gas stream is globally bounded by a ring, made up of several successive separate ring parts that correspond to successive sectors of the turbomachine. Two adjacent sectors are liable to undergo different displacements during the operation of the turbomachine, so that the two corresponding ring parts are liable to undergo movements independent of each other, both in the axial direction and in the radial direction.

To permit relative displacements between two adjacent ring parts, the latter are separated by a functional clearance, which also allows them to undergo any thermal expansion.

However, owing to the presence of this functional clearance between the two ring parts, very hot gases flowing in the stream are liable to be reintroduced into the enclosure via this functional clearance.

SUMMARY OF THE INVENTION

The object of the present invention is to remedy the above-mentioned drawback.

According to a first aspect, the invention relates to a gastight sealing device associated with a functional clearance existing between two sectors of a turbomachine, which device comprises an annular plate wound up on itself over at least one turn and covering the functional clearance.

In a first embodiment of the sealing device, the annular plate is wound up on itself over a single turn, its two ends being separated from each other by a defined gap.

According to a second embodiment of the sealing device, the annular plate is wound up on itself over several turns in the manner of a spiral.

According to a second aspect, the invention relates to an aircraft engine equipped with such a sealing device.

BRIEF DESCRIPTION OF THE DRAWINGS

The invention will be more clearly understood on reading the following detailed description of embodiments of the invention, given by way of illustration but implying no limitation, with reference to the appended drawings in which.

DETAILED DESCRIPTION OF PARTICULAR EMBODIMENTS

Figure 1:
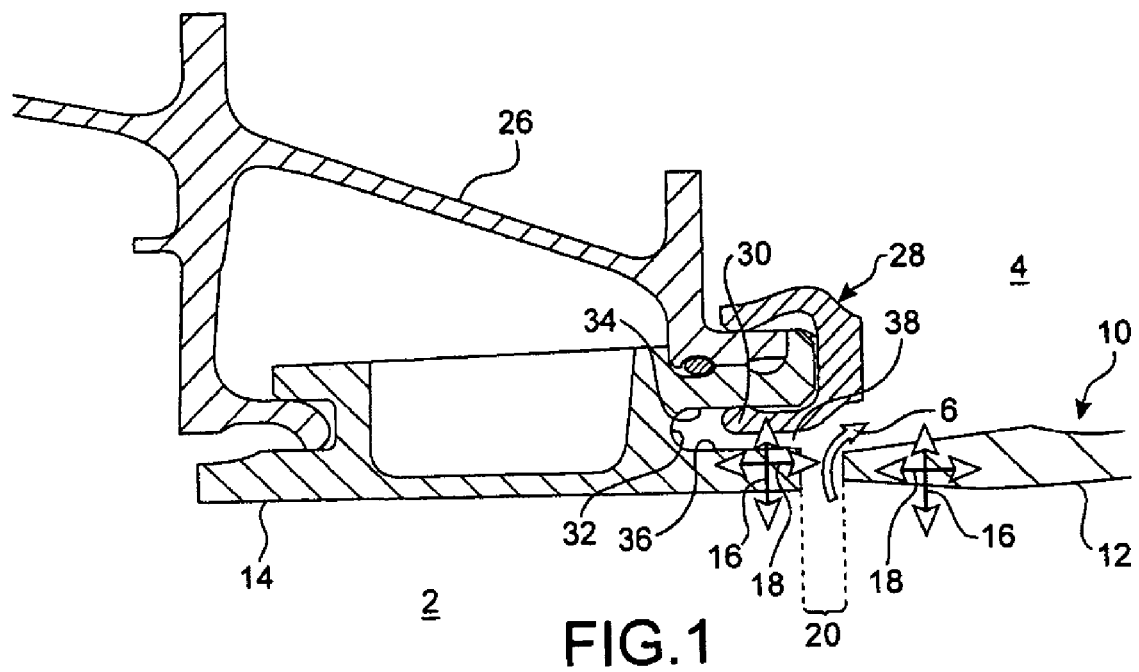
FIG. 1 shows, in axial section, two successive sectors of a turbine of an aircraft engine, said sectors being separated by a functional clearance, in the absence of a sealing device.

FIG. 1 shows a turbine ring portion 10 of an aircraft engine, which separates a gas stream 2 from an outer enclosure 4. This ring 10 comprises a first ring part 12 and a second ring part 14. The two ring parts 12, 14 each belong to two sectors of the turbomachine, which in the example illustrated are two turbine sectors. During operation of the turbomachine, each ring part 12, 14 is liable to move along the radial direction, as shown by the arrows 16, and along the axial direction, shown by the arrows 18. Because the two ring parts 12, 14 belong to different sectors, their respective movements are independent of each other during operation of the turbomachine. In addition, each ring part is liable to undergo a thermal expansion during operation of the turbomachine.

To allow these movements of each ring part 12, 14 and their possible thermal expansion, a functional clearance 20 is provided between the two ring parts 12, 14.

During operation of the turbomachine, the presence of this functional clearance 20 has the consequence that very hot air flowing in the gas stream 2 passes into the outer enclosure 4 via this functional clearance 20, as indicated by the arrow 6.

The object of the present invention is to prevent a very hot gas, coming from the stream 2, from thus passing into the enclosure 4 via the clearance 20, so as to prevent a temperature rise in the enclosure 4.

In FIG. 1, the first ring part 12 is shown very schematically by one of its ends, whereas the second ring part 14 is shown as being fixed to a turbine casing 26 by means of an annular jaw-grip-shaped piece 28. For this purpose, the second ring part 14 has an annular groove 32 having two edges 34, 36 lying along the axial direction. One of the jaws 30 of the jaw-grip-shaped piece 28 comes to bear against the radially outer edge 34 of the groove 32. Between the jaw 30 and the radially inner edge 36 of the annular groove 32 there is an annular space 38.

As illustrated in FIGS. 2 to 5, the sealing device according to the invention comprises an annular plate 100 wound up on itself, which obstructs the functional clearance 20 present between the two ring parts 12, 14 and is held in place by means of components forming part of the immediate environment of the functional clearance 20.

Figure 2:
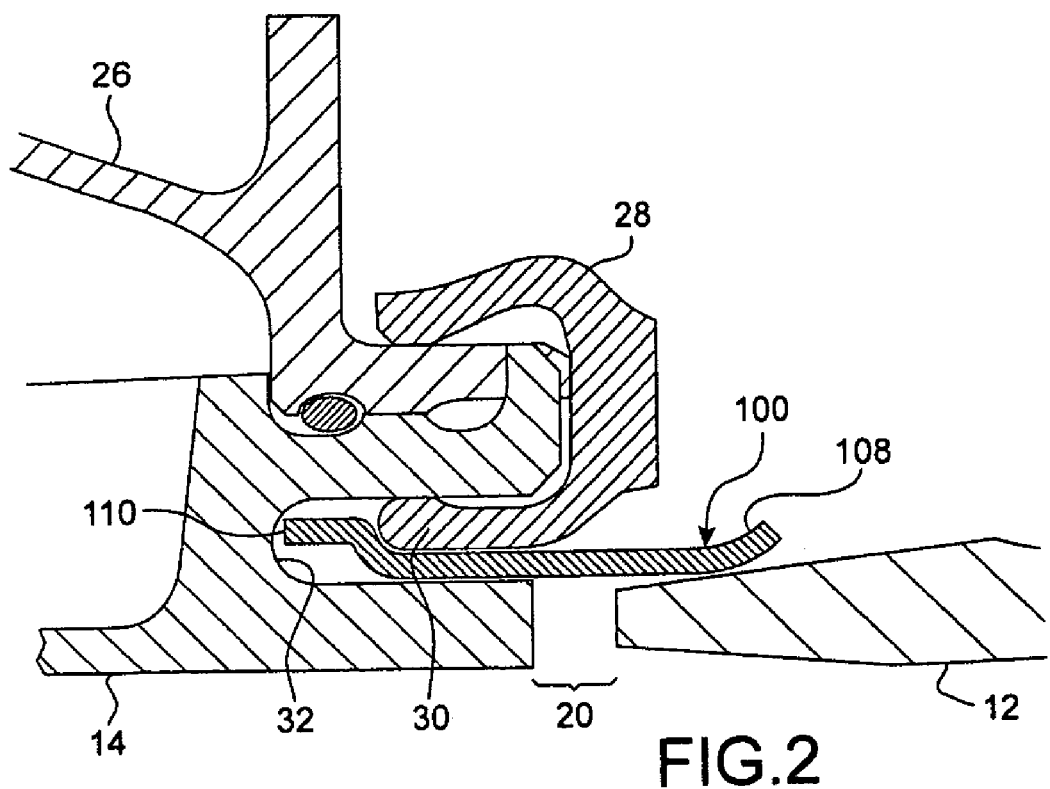
FIG. 2 shows, in enlarged axial section, two successive sectors of a turbine of an aircraft engine, said sectors being separated by a functional clearance, in the presence of a first embodiment of the sealing device according to the invention.
Figure 4:
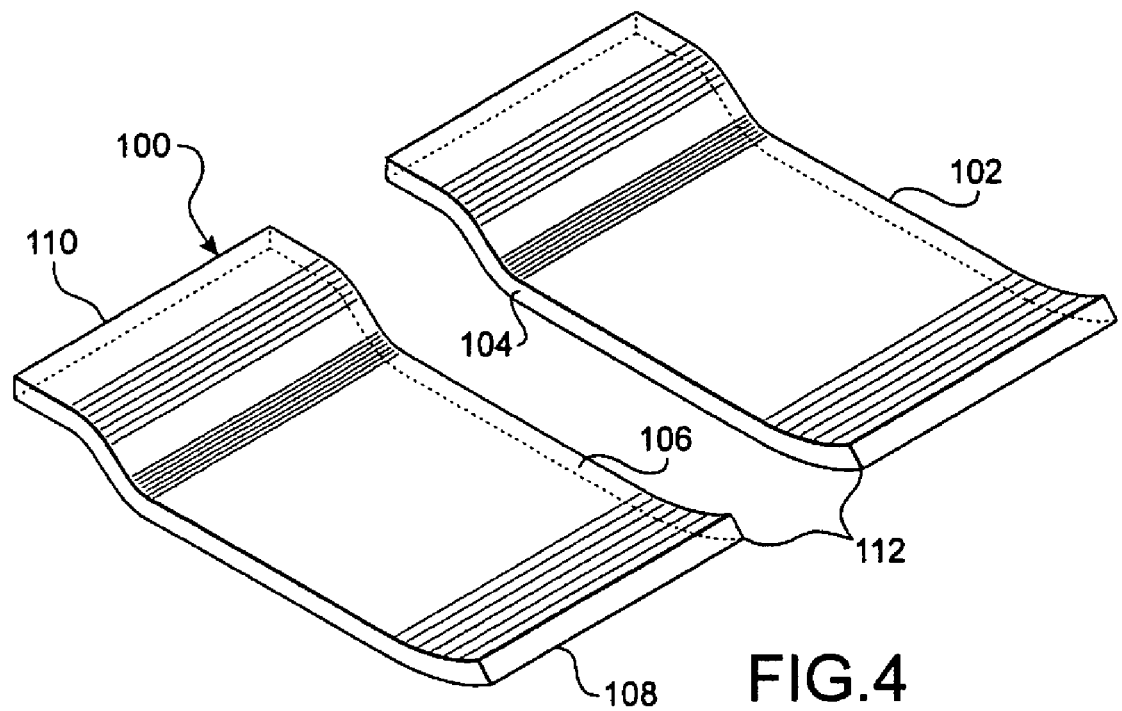
FIG. 4 shows, in a perspective view, a portion of the sealing device according to the first embodiment.

A first embodiment of this annular plate 100 is shown in FIGS. 2 and 4. FIG. 4 shows a portion of the isolated annular plate 100, in perspective view, whereas FIG. 2 shows said plate in situation, in axial section. According to the first embodiment, this annular plate 100 takes the form of a relatively inflexible "thick metal sheet" 102 wound up on itself over approximately one turn. A defined gap 112 is left between the two free ends 104, 106 of said annular plate 100, which gap allows the relatively inflexible thick metal sheet to be mounted in the desired place. This gap 112 also allows this head to expand when the temperature in the turbomachine increases.

As illustrated in FIG. 2, the shape of the annular plate 100 is designed so that it covers the functional clearance 20 and is held in place so as to obstruct the latter. It has a first longitudinal edge 108 on the side facing the first ring part 12 (on the right in FIG. 2) and a second longitudinal edge 110 on the side facing the second ring part 14 (on the left in FIG. 2).

The second longitudinal edge 110 fits into the annular space 38. For this purpose, it forms a shoulder matching the shape of the end of the jaw 30. Preferably, it butts against the bottom of the annular groove 32. The thickness of the annular plate 100 is designed so that the annular plate 100 and the jaw 30 are mutually contiguous and tightly fitted into the annular groove 32. The first longitudinal edge 108 is placed on the first ring part 12. This edge is slightly raised radially outwards so that the plate 100 bears better on the first ring part 12.

The first embodiment of the annular plate 100 has a slight drawback in that very hot gases coming from the gas stream 2 nevertheless are able to enter the outer enclosure 4 via the mounting gap 112.

Figure 3:
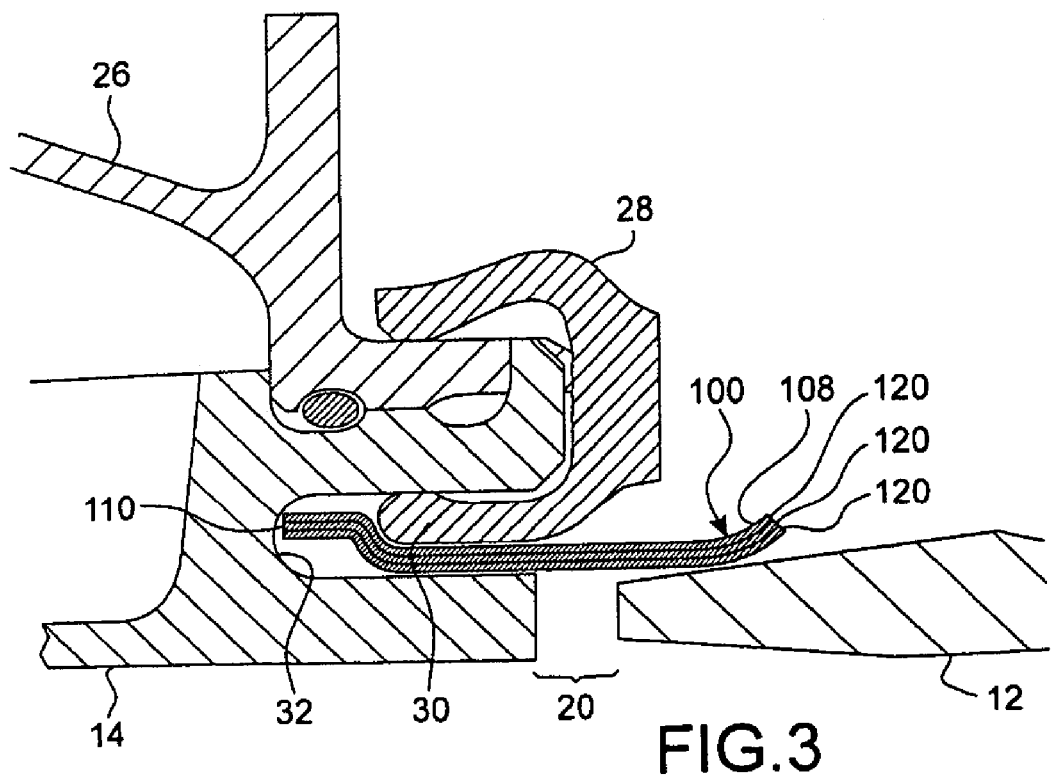
FIG. 3 shows, in enlarged axial section, two successive sectors of a turbine of an aircraft engine, said sectors being separated by a functional clearance, in the presence of a second embodiment of the sealing device according to the invention.
Figure 5:
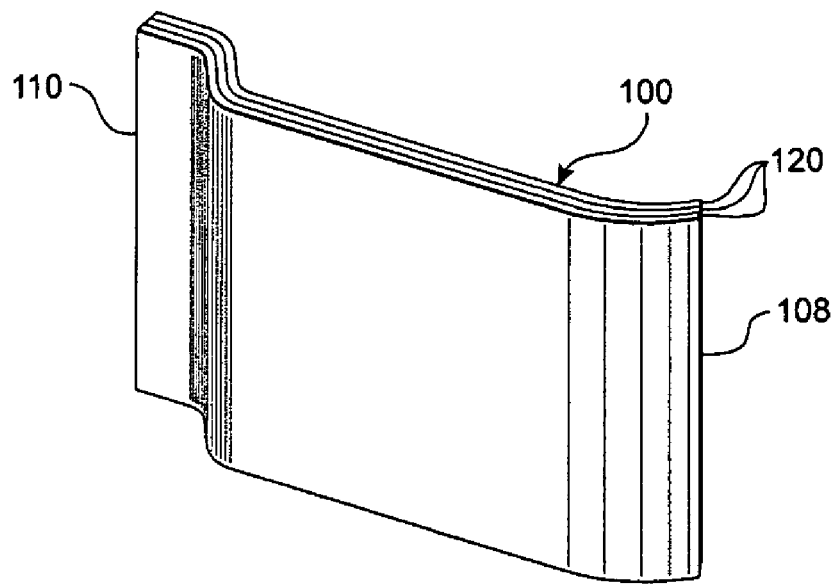
FIG. 5 shows, in a perspective view, a portion of the sealing device according to the second embodiment.

A second embodiment of the annular plate 100 allows this drawback to be remedied. It is depicted in FIGS. 3 and 4. FIG. 5 shows a portion of the isolated annular plate 100, in perspective view, whereas FIG. 3 shows the plate in situation, in axial section. According to the second embodiment, this annular plate 100 takes the form of a relatively flexible "thin metal sheet" 120 and is wound up on itself over several turns in the manner of a spiral. In the example illustrated, it is wound over three turns.

One advantage of the second embodiment over the first embodiment lies in the fact that the "thin metal sheet" 120 is more flexible than the "thick metal sheet" 102 of the first embodiment and can be put into place without it being necessary to provide a mounting gap 112. Because this thin metal sheet 120 is wound as a spiral, the mounting and the fitting of the annular plate 100 are facilitated.

Another advantage of the second embodiment over the first embodiment lies in the fact that the structure in the form of a wound thin metal sheet 120 gives the annular plate 100 a pliancy allowing it to adapt to the relative displacements of the two ring parts 12, 14, that is to say of the two sectors, thereby providing a better seal. This pliancy results from the fact that the windings can slide against one another.

To illustrate the foregoing, the following dimensions are compatible with the invention:

First Embodiment thickness of the "thick metal sheet": 0.6 mm
width of the mounting gap 112: 11 mm Second Embodiment thickness of the thin metal sheet: 0.2 mm
number of winding turns: 3

Thus, for the same total thickness (0.6 mm) of the annular plate 100, the annular plate 100 of the second embodiment is more pliant than the annular plate 100 of the first embodiment.

The annular plate 100 may be made of any material capable of withstanding a high temperature, such as for example a metal like steel, so as to form a heat shield between the gas stream 2 and the outer enclosure 4 at the functional clearance 20. Current steels that meet this condition are known as Waspaloy, HA188 or INCO 718.

The invention is not limited to the embodiments that have just been described.

In particular, the annular plate 100 according to the second embodiment may consist of a thin metal sheet wound 2 times, or more than 3 times, for example 5 times, 8 times or 10 times, depending on the radial dimension of the annular space 38 and of the jaw 30 of the jaw-grip-shaped piece 28.

Likewise, in a different configuration, for example in another location of the turbomachine, different from that which has just been described, the shape of the annular plate 100 may be different. In common with the first and second embodiments, the shape of the annular plate 100 is matched to the components in the immediate environment of the functional clearance 20 and designed to be held in position against the functional clearance 20.

Thus, with the gastight sealing device according to the first aspect of the invention, it is possible to prevent very hot air flowing in the gas stream of the turbomachine from being reintroduced into an enclosure external to this very hot gas stream, thereby preventing a rise in temperature in this enclosure.

Preferably, the turbomachine is an aircraft engine that includes at least one sealing device according to the first aspect of the invention.

The invention claimed is:

1. A turbomachine assembly comprising:
a first ring part of a ring portion and a second ring part of the ring portion, said ring portion separating a high temperature gas stream from an outer enclosure, wherein said first and second ring parts define a functional axial clearance;
a component, having a portion in an immediate environment of said functional axial clearance; and
a sealing device associated with the functional axial clearance, wherein said sealing device comprises an annular plate wound up on itself over several turns in a spiral and is free of gaps so that said plate prevents air of the gas stream from passing into the outer enclosure via said axial clearance, wherein said several turns form windings that are slidable against one another thereby providing a pliancy to said annular plate such that said pliancy allows said annular plate to adapt to relative displacement of said first and second ring parts, said annular plate covering said functional axial clearance so as to impede said air of the high temperature gas stream from passing into the outer enclosure via said axial clearance, said annular plate having a first longitudinal edge positioned on a first side facing the first ring part and a second longitudinal edge positioned on a second side facing the second ring part, wherein the first longitudinal edge is curved radially outwards towards the outer enclosure, and wherein the second longitudinal edge includes a shoulder with a concave surface that contacts said portion of said component in the immediate environment of said functional axial clearance, and wherein said shoulder and a thickness of said annular plate are such that said annular plate is held in position by contact between said component and said second ring part.

2. The turbomachine assembly according to claim 1, wherein said annular plate is wound over three turns.

3. The turbomachine assembly according to claim 1, wherein said annular plate is wound over five turns.

4. An aircraft engine comprising the turbomachine assembly according to claim 1, wherein said high temperature gas stream flows in an axial direction of said aircraft engine, wherein said first part belongs to a first turbine sector and said second part belongs to a second turbine sector axially adjacent to said first turbine sector, wherein said first ring part has a first radially inner axial surface exposed to said high temperature gas stream, said second ring part has a second radially inner axial surface exposed to said high temperature gas stream, and said axial clearance separates said first and second radially inner surfaces.

5. The aircraft engine according to claim 4, wherein said first ring part has a first radially outer axial surface unexposed to said high temperature gas stream, said second ring part has a second radially outer axial surface unexposed to said high temperature gas stream, wherein said axial clearance separates said first and second radially outer surfaces, and wherein said first longitudinal edge of said annular plate is positioned against said first radially outer axial surface and said second longitudinal edge is positioned against said second radially outer axial surface.

6. The aircraft carrier according to claim 5, wherein said annular plate is flexibly mounted on said first and second ring parts so that said first longitudinal edge bears radially inward against said first radially outer axial surface of said first ring part and said second longitudinal edge bears radially inward against said second radially outer axial surface of said second ring part.

7. The aircraft engine according to claim 6, wherein said second longitudinal edge is tightly fitted into a groove of said second ring part.

8. The turbomachine assembly according to claim 1, wherein said concave surface of said shoulder matches a shape of said portion of said component.

9. A turbomachine assembly comprising:

a first ring part of a ring portion and a second ring part of the ring portion, said ring portion separating a high temperature gas stream from an outer enclosure, wherein said first and second ring parts define a functional axial clearance;

a component having a portion in an immediate environment of said functional axial clearance; and a sealing device associated with the functional axial clearance, wherein said sealing device comprises an annular plate having two ends facing each other and separated from each other by a defined gap, said annular plate covering said functional axial clearance so as to impede air of the high temperature gas stream from passing into the outer enclosure via said axial clearance, said annular plate having a first longitudinal edge positioned on a first side facing the first ring part and a second longitudinal edge positioned on a second side facing the second ring part, wherein the first longitudinal edge is curved radially outwards towards the outer enclosure, and wherein the second longitudinal edge includes a shoulder with a concave surface that contacts said portion of said component in the immediate environment of said functional axial clearance, and wherein said shoulder and a thickness of said annular plate are such that said annular plate is held in position by contact between said component and said second ring part.

10. The turbomachine assembly according to claim 9, wherein said concave surface of said shoulder matches a shape of said portion of said component.

\* \* \* \* \*